US008259428B2

(12) United States Patent
Mollema et al.

(10) Patent No.: US 8,259,428 B2
(45) Date of Patent: Sep. 4, 2012

(54) INPUT PROTECTION CIRCUIT

(75) Inventors: Scott A. Mollema, Rockford, MI (US); David W. Baarman, Fennville, MI (US); Andrew C. Zeik, Hudson, OH (US); Dale R. Liff, Kent, OH (US); Mark A. Blaha, Twinsburg, OH (US)

(73) Assignee: Access Business Group International LLC, Ada, MI (US)

( * ) Notice: Subject to any disclaimer, the term of this patent is extended or adjusted under 35 U.S.C. 154(b) by 339 days.

(21) Appl. No.: 12/428,713

(22) Filed: Apr. 23, 2009

(65) Prior Publication Data

US 2009/0268356 A1 Oct. 29, 2009

Related U.S. Application Data

(60) Provisional application No. 61/048,036, filed on Apr. 25, 2008.

(51) Int. Cl.
*H02H 5/04* (2006.01)
*H02J 7/00* (2006.01)
(52) U.S. Cl. ......... 361/103; 320/107; 320/108; 320/115
(58) Field of Classification Search .................. 361/103; 320/108, 115, 107
See application file for complete search history.

(56) References Cited

U.S. PATENT DOCUMENTS

| | | | | |
|---|---|---|---|---|
| 3,794,898 A | * | 2/1974 | Gross | 318/380 |
| 4,866,563 A | * | 9/1989 | Howard et al. | 361/124 |
| 5,600,225 A | * | 2/1997 | Goto | 320/108 |
| 6,016,046 A | * | 1/2000 | Kaite et al. | 320/108 |
| 6,122,157 A | | 9/2000 | Gerlach | |
| 6,307,758 B1 | | 10/2001 | Geren | |
| 6,553,263 B1 | * | 4/2003 | Meadows et al. | 607/61 |
| 6,608,470 B1 | | 8/2003 | Oglesbee | |
| 7,242,566 B2 | | 7/2007 | Yegin et al. | |

FOREIGN PATENT DOCUMENTS

JP 2006288155 10/2006

OTHER PUBLICATIONS

International Search Report and Written Opinion, International Application No. PCT/US2009/041505, International Filing Date Apr. 23, 2009.
Cantherm, Thermal Links data sheets, 2007.
Panasonic, Thermal Cutoffs (TCO)/Thermal-links data sheets, Feb. 2007.
Littelfuse, Transient Voltage Suppressors data sheets.

* cited by examiner

*Primary Examiner* — Rexford Barnie
*Assistant Examiner* — Scott Bauer
(74) *Attorney, Agent, or Firm* — Warner Norcross & Judd LLP

(57) ABSTRACT

A voltage clamp protection circuit to protect against overvoltage conditions where there is insufficient current to blow a fuse. The voltage clamp protection circuit includes a voltage clamp and a thermal cutoff. The voltage clamp clamps any overvoltage to a clamping voltage. If an overvoltage condition persists for too long the voltage clamp dissipates a sufficient amount of heat to activate the thermal cutoff creating an open circuit that protects the rest of the circuit. The voltage clamp protection circuit may be used in combination with a variety of other protection circuits to provide increased protection.

25 Claims, 4 Drawing Sheets

INPUT PROTECTION CIRCUIT

This application claims the benefit of U.S. Provisional Patent Application 61/048,036, which was filed on Apr. 25, 2008.

BACKGROUND OF THE INVENTION

The present invention relates to an input protection circuit suitable for use in an inductively coupled circuit or essentially any other type of electrical circuit.

There are many advantages to inductive coupling. One advantage is that inductive coupling allows additional opportunities for simple and efficient interoperability where devices can be used interchangeably. However, circuit designs that "cut the cord" and enable this interchangeability have the potential to make the circuit vulnerable to third party systems. That is, magnetic fields produced by third party systems may inadvertently energize the secondary coil in a remote device and provide an inappropriate amount of power. In some circumstances the power from these third party sources can be destructive. As wireless power becomes more widespread so too will the amount and variety of third party magnetic fields.

A variety of protection circuits are well known in wired applications. For example, fuses, circuit breakers, temperature sensors and current limiters are commonly used protection mechanisms to control some risks. Some of these components, like many other protection circuits, rely on an appropriate power source for operation. At times, an appropriate power source may not be available, such as may be the case in an inductively coupled environment.

Some protection circuits do not rely on an appropriate power source for operation. For example, a transient voltage suppressor ("TVS") is one such protection circuit. A TVS is designed to react to sudden or momentary overvoltage conditions, such as those caused by lightning or motor arcing. A TVS operates by shunting excess current when the voltage exceeds an avalanche breakdown potential. A TVS is a clamping device that suppresses substantially all overvoltages above its breakdown voltage. Like most clamping devices, it automatically resets when the overvoltage goes away, but absorbs much of the transient energy internally. The transient energy is typically dissipated using a heatsink. However, if the overvoltage condition persists too long the TVS may break down, which could result in the circuit being damaged or destroyed.

Accordingly, it is desirable to provide a protection circuit that can protect a circuit from, among other things, persistent overvoltage conditions—even when an appropriate power source for the protection circuit is not available.

SUMMARY OF THE INVENTION

The present invention provides a protection circuit that includes a voltage clamp thermally coupled to a thermal cutoff. The voltage clamp provides some protection from overvoltage conditions. If an overvoltage condition persists for too long the voltage clamp dissipates a sufficient amount of heat to activate the thermal cutoff creating an open circuit that protects the rest of the circuit.

In one embodiment, the protection circuit is a sub-circuit in an inductively powered secondary circuit. In this embodiment, third party magnetic fields may induce unwanted voltage in the secondary coil of the secondary circuit. The voltage clamp clamps the voltage to a desired level. Instead of dissipating the energy in the voltage clamp to a heatsink, energy is dissipated to the thermal cutoff in the form of heat. Optionally, thermal adhesive may be used to assist in the transfer of heat from the voltage clamp to the thermal cutoff. The longer the voltage clamp remains active, the more heat is dissipated to the thermal cutoff. Once a threshold temperature is reached in the thermal cutoff an open circuit is created.

One advantage of this embodiment of the protection circuit is the ability to create an open circuit when there is insufficient power to activate an alternative protection component, such as an electrical fuse. In some circumstances, such as an inductively powered remote device, there may be an overvoltage condition yet a low amount of available current. Because the voltage clamp does not require a power source or input from a microcontroller, the voltage clamp is able to maintain its functionality. However, a typical voltage clamp cannot sustain exposure to an overvoltage condition indefinitely. Eventually, the heat generated by the voltage clamp can cause the voltage clamp to malfunction. In the current embodiment, before malfunction occurs, sufficient heat is produced to activate a thermal cutoff and create an open circuit that protects the rest of the circuit. This allows protection from an overvoltage condition even where there would not have been enough current to activate an alternative protection component. Although this implementation is particularly suited for protecting inductively powered remote devices, it is also suitable for use in essentially any electrical circuit. Other advantages of the voltage clamping protection circuit include 1) a relatively low impedance; and 2) microprocessor control is unnecessary.

In another embodiment, the protection circuit of the present invention is used in combination with other protection circuitry to provide a wider scope of protection. In one embodiment, a combination of protection circuitry defines a window of operation for the circuit, different protection circuitry triggers on different fault conditions, both expected and unexpected. For example, some protection circuitry may be designed to protect the load, while other protection circuitry may be designed to protect the secondary circuit as a whole. Some protection circuitry may be designed to protect against overvoltage conditions and other circuitry may be designed to protect against overcurrent conditions. Further, some protection circuitry may be designed to protect against transients or persistent fault conditions. In one embodiment, three distinct tiers of protection are provided: 1) an electrical fuse provides increased protection for the circuit generally against large transients; 2) a field effect transistor controlled by a microprocessor provides load protection in response to one or more sensed characteristics, including frequency, temperature, input voltage or input current; and 3) a voltage clamp protection circuit including a thermal cutoff provides increased general circuit protection against both transient and persistent overvoltage conditions, even where current is low.

These and other objects, advantages, and features of the invention will be more fully understood and appreciated by reference to the description of the current embodiment and the drawings.

DESCRIPTION OF THE CURRENT EMBODIMENT

Figure 1:
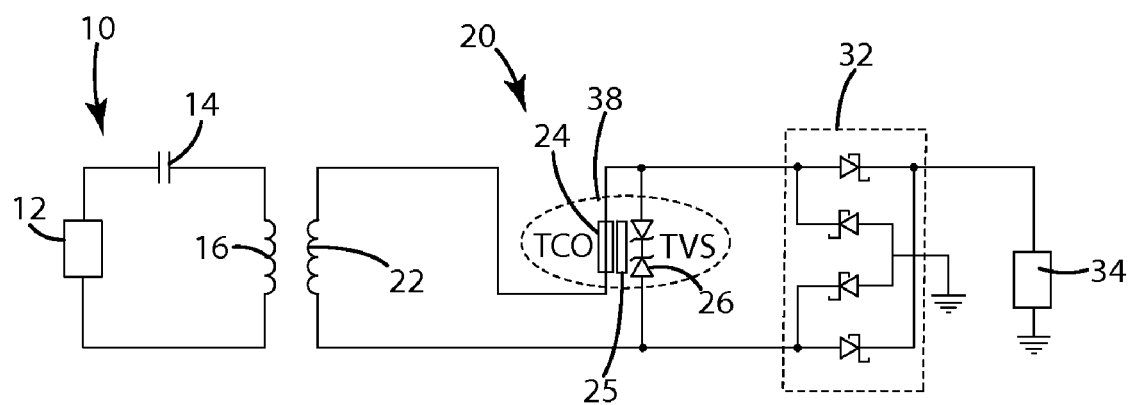
FIG. 1 is a circuit diagram of one embodiment of an inductively coupled system including a voltage clamp protection circuit.

Referring now to FIG. 1, a diagram of an inductively coupled system having a voltage clamp protection circuit 38 in accordance with an embodiment of the present invention is shown. The illustrated inductively coupled system includes an inductive power supply 10 and a remote device 20. The inductive power supply 10 includes a power supply circuit 12, a capacitor 14 and a primary coil 16. The remote device 20 includes a secondary coil 22, a thermal cutoff 24, a voltage clamp 26, optional thermal adhesive 25, an optional rectification circuit 32 and a load 34. The voltage clamp protection circuit 38 generally includes at least two components, the voltage clamp 26 and the thermal cutoff 24. In the illustrated embodiment, the voltage clamp 26 and the thermal cutoff 24 are thermally coupled to each other with an optional thermal adhesive 25. The thermal cutoff 24 is electrically connected between the secondary coil 22 and the rest of the circuit. The voltage clamp 26 clamps the input voltage in response to an overvoltage condition. If the overvoltage condition persists for too long the voltage clamp dissipates a sufficient amount of heat to activate the thermal cutoff 24 and create an open circuit that protects the rest of the circuit, in the current embodiment that includes the full bridge rectification circuit 32 and the load 34.

The voltage clamp protection circuit 38 is particularly suited for use within an inductively coupled system because of some of the challenges and restrictions that inductively coupled systems face. Although the voltage clamp protection circuit 38 is largely described in connection with an inductively coupled system, the voltage clamp protection circuit 38 is suitable to provide some protection for essentially any electrical circuit.

Although the embodiment illustrated in FIG. 1 is described in connection with a resonant primary, the present invention is suitable for use with non-resonant primaries as well. Further, in the embodiment illustrated in FIG. 1 the voltage clamp protection circuit 38 is the sole protection mechanism. In other embodiments, such as those shown in FIGS. 2-4, the voltage clamp protection circuit 38 may be one of a number of different protection circuits that are used in combination to protect the circuit from various expected and unexpected fault conditions.

The present invention is suitable for use with essentially any remote device in any inductively coupled system. Accordingly, the inductive power supply 10 and remote device 20 will not be described in detail. Suffice it to say that the inductive power supply 10 includes power supply circuit 12 and a primary coil 16 and the remote device 20 includes a secondary coil 22 and a secondary load 34, which could be a battery or essentially any other load. The power supply circuit 12 generates and applies alternating current to the primary coil 16. As a result of the alternating current applied by the power supply circuit 12, the primary coil 16 generates an electromagnetic field. The power supply circuit 12 may be essentially any circuitry capable of supplying alternating current to the primary coil 16. For example, the power supply circuit 12 may be the resonant seeking circuit of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

The primary coil 16 of the illustrated embodiment is a circular coil of wire suitable for generating an electromagnetic field. In some applications, the primary coil 16 may be a coil of Litz wire. The characteristics of the coil may vary from application to application. For example, the number of turns, size, shape and configuration of the coil may vary. Further, the characteristics of the wire may vary, such as length, gauge and type of wire. Although described in connection with a coil of wire, the primary coil 16 may alternatively be essentially any structure capable of generating a suitable electromagnetic field. In one embodiment, the primary coil 16 (or secondary coil 22) may be replaced by a printed circuit board coil, such as a printed circuit board coil incorporating the inventive principles of U.S. Ser. No. 60/975,953, which is entitled "Printed Circuit Board Coil" and filed on Sep. 28, 2007 by Baarman et al, and which is incorporated herein by reference in its entirety.

As noted above, the remote device 20 generally includes a secondary coil 22, voltage clamping protection circuit 38, an optional rectification circuit 32 and a load 34. The remote device 20 is illustrated representatively in the drawings, but it may be essentially any device or component that operates on or otherwise responds to an electromagnetic field. For example, in one embodiment, the remote device 20 may be an active device having a load 34 that operates on electrical power received inductively from the inductive power supply 10, such as a cell phone, personal digital assistant, digital media player or other electronic device that may use inductive power to recharge an internal battery. In the embodiment illustrated in FIG. 1, the optional rectification circuit 32 rectifies the power provided to the load. In alternative embodiments, the rectification circuit 32 may be replaced or deleted.

The secondary coil 22 of the illustrated embodiment is a circular coil of wire suitable for generating electricity when in the presence of a varying electromagnetic field. In some applications, the secondary coil 22 may be a coil of Litz wire. As with the primary coil 16, the characteristics of the secondary coil 22 may vary from application to application. For example, the number of turns, size, shape and configuration of the secondary coil 22 may vary. Further, the characteristics of the wire may vary, such as length, gauge and type of wire. Although described in connection with a coil of wire, the secondary coil 22 may alternatively be essentially any structure capable of generating sufficient electrical power in response to an electromagnetic field.

The voltage clamping protection circuit 38 will now be described in more detail. As noted above, the voltage clamping protection circuit 38 includes two primary components, a voltage clamp 26 and a thermal cutoff 24. The components of the voltage clamping protection circuit 38 may be off the shelf components or specifically designed components with a specific set of characteristics for a particular application. Optionally, thermal adhesive 25 may be used to thermally couple the voltage clamp 26 and the thermal cutoff 24. Alternatively, the voltage clamp 26 and thermal cutoff 24 may be placed in proximity to one another to facilitate sufficient heat transfer. In some embodiments, the use of thermal adhesive 25 may decrease the amount of heat the voltage clamp 26 needs to produce in order to trip the thermal cutoff 24. The resistance of the voltage clamping protection circuit 38 is relatively low. For example, in the embodiment illustrated in FIG. 1, the voltage clamping protection circuit 38 has about 10 milliohms of resistance. Further, no microprocessor control is necessary for operation of the voltage clamping protection circuit 38.

The voltage clamp 26 clamps the voltage to a desired level and dissipates energy in the form of heat. In general, a voltage clamp circuit includes any electrical circuitry used to prevent another circuit from exceeding a certain predetermined voltage level. In the current embodiment, the voltage clamp 26 is capable of dissipating heat sufficient to trip the thermal cutoff without damaging the voltage clamp. Typically, a voltage clamp operates by sensing the voltage of the monitored circuit and if the voltage threatens to exceed the limit, applies an electric load that draws current from the output in a regulated manner in order to prevent the voltage from exceeding the predetermined voltage level. A strict clamp is not crucial to the operation of the voltage clamping protection circuit 38. That is, in many embodiments, the accuracy of the clamp is not a limiting factor to operation of the protection circuit. For example, designed correctly, a voltage clamp may operate above or below its rating with a high degree of tolerance without affecting operation of the voltage clamp protection circuit 38. Further, in some embodiments, the clamp circuit may include transition periods where the clamping voltage varies or momentarily departs from its designed characteristics without substantially affecting the performance of the voltage clamping protection circuit 38. For example, a brief transition period for the voltage clamp once the clamping circuit activates, but before it clamps the voltage is acceptable and does not substantially affect the performance of the protection circuit.

Essentially any voltage clamp 26 is suitable for use in the voltage clamp protection circuit 38. The specific type of voltage clamp and its specific characteristics may vary from application to application. In the embodiment illustrated in FIG. 1 the voltage clamp 26 is a single transient voltage suppression ("TVS") diode. A TVS diode is an electrical component used to protect electronics from voltage spikes. The TVS diode operates by shunting excess current when the induced voltage exceeds the avalanche breakdown potential. It is a clamping device, suppressing overvoltages above its breakdown voltage. Like most clamping devices, it automatically resets when the overvoltage goes away, but absorbs some of the transient energy internally.

Typically, an off the shelf TVS diode is thermally coupled to a heatsink in order to dissipate the absorbed transient energy. In the embodiment illustrated in FIG. 1, the thermal cutoff 24 is thermally coupled to the TVS diode instead of a heatsink. In alternative embodiments, the TVS diode may be thermally coupled to both a heatsink and a thermal cutoff 24. In other alternative embodiments, the voltage clamping protection circuit is produced as a single component where the TVS diode is thermally coupled to a thermal cutoff during manufacture. In yet other embodiments, the heatsink may be removed from an off the shelf voltage clamp and thermally coupled to a thermal cutoff using thermal adhesive. In some applications, thermal coupling may be unnecessary, physical proximity between the voltage clamp and thermal cutoff is sufficient to reliably transfer enough heat from the voltage clamp to the thermal cutoff.

The TVS diode of the voltage clamp protection circuit illustrated in FIG. 1 is bidirectional. The bidirectional TVS diode is connected in parallel with the circuit to be protected, in this embodiment the rectification circuit 32 rectifies the power going to the load 34. The bidirectional TVS diode may be implemented as a single component or as two opposing avalanche diodes. An avalanche diode is a diode that is designed to go through avalanche breakdown at a specified reverse bias voltage. In some applications, Zener diodes may replace avalanche diodes.

A bidirectional TVS diode is merely one example of a voltage clamp suitable for use with the present invention. In alternative embodiments, other voltage clamps may be suitable, such as, for example a metal oxide varistor ("MOV"). A varistor is an electronic component with a significant non-ohmic current-voltage characteristic. Varistors typically protect circuits against excessive transient voltages by incorporating them into the circuit such that when triggered, they will shunt the current created by the high voltage away from sensitive components. In one embodiment, a sufficient amount of heat is dissipated by a varistor in order to activate a thermal cutoff before the varistor fails.

A thermal cutoff interrupts electrical current flow when heated to a specific temperature. Thermal cutoffs may typically be found in heat-producing electrical appliances such as hair dryers and coffeemakers. There are two main categories of thermal cutoffs, thermal fuses and thermal switches. A thermal fuse is a cutoff which uses a one-time fusible link. A thermal switch, sometimes referred to as a thermal reset, is a device which normally opens at a high temperature and re-closes when the temperature drops.

A thermal cutoff is typically characterized by a trip point temperature. In the embodiment illustrated in FIG. 1 the thermal cutoff 24 is implemented as a one time thermal fuse with a 102 degrees Celsius trip point. In one embodiment, once the voltage clamp reaches approximately 113 degrees Celsius enough heat is transferred to the thermal cutoff to reach the trip point. The voltage clamp temperature necessary to trigger the thermal cutoff may depend on a variety of factors including the surface area of the thermal couple between the voltage clamp and thermal cutoff, if any, the proximity between the voltage clamp and the thermal cutoff, the trip point of the thermal cutoff, the temperature of the voltage clamp, the length of time over which the voltage clamp dissipates heat and a number of other various factors. Once the thermal fuse has been tripped it may be replaced with a new un-tripped fuse making the voltage clamp protection circuit operational again. In one embodiment, the voltage clamp protection circuit is manufactured as a single replaceable component.

In alternative embodiments, the thermal cutoff automatically resets. In automatic resetting embodiments, a thermal switch is implemented instead of a one time use thermal fuse. In one embodiment, the thermal switch includes a field effect transistor electrically coupled to a thermocouple. A thermocouple is a sensor for measuring temperature. Two dissimilar metals are joined together at one end and when the junction of the two metals is heated or cooled a voltage is produced that can be correlated back to the temperature. Essentially, this allows for conversion of thermal potential difference into electric potential difference. The electric potential difference can be used to control a switch.

In one embodiment, a thermocouple is thermally coupled to the voltage clamp. If the voltage clamp heats the thermocouple past a threshold temperature the thermocouple generates and sends a control signal to the field effect transistor to open the circuit, which relieves the fault condition thereby causing the voltage clamp to cool down. Once the voltage clamp cools down past a threshold temperature, the thermocouple generates and sends a control signal to the field effect transistor to close the circuit.

The voltage clamp protection circuit described above may be used in combination with a variety of other protection circuitry to provide a wide scope of circuit protection for numerous fault conditions, both expected and unexpected.

Figure 2:
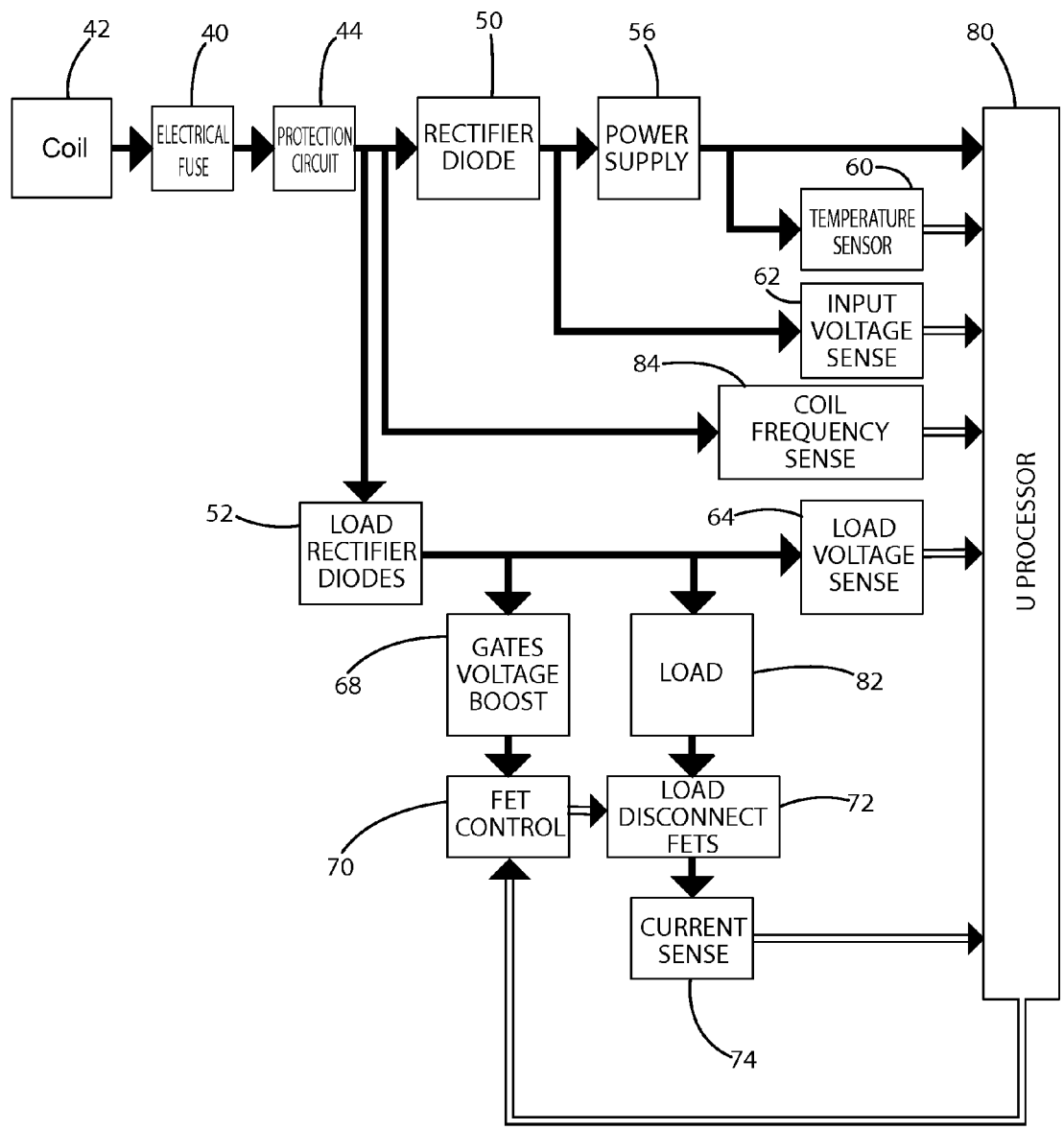
FIG. 2 is a functional block diagram of one embodiment of a secondary circuit including a voltage clamp protection circuit.
Figure 3:
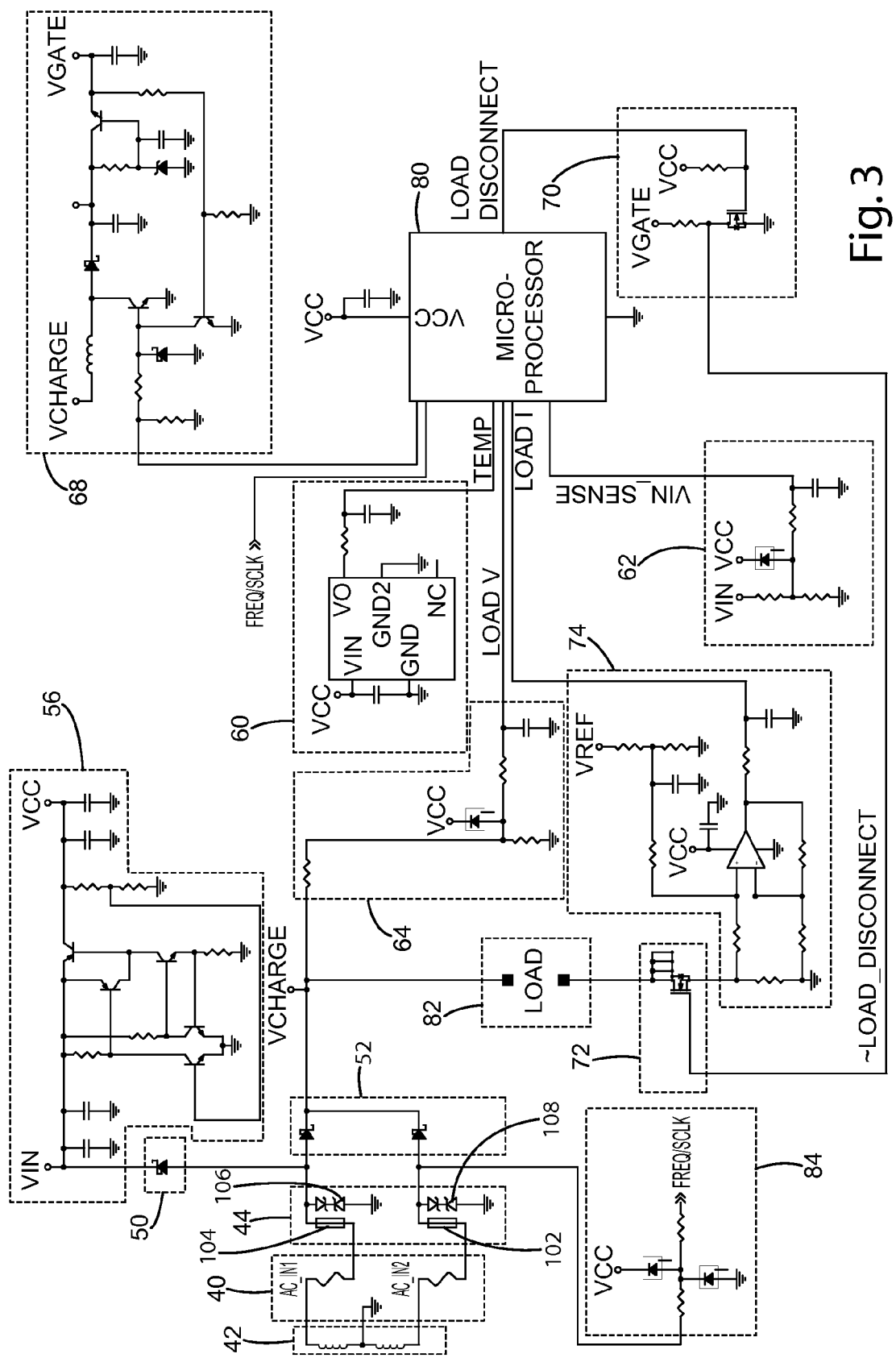
FIG. 3 is a circuit diagram of one embodiment of the secondary circuit of FIG. 2.

In the embodiment illustrated in FIGS. 2 and 3, three distinct tiers of circuit protection are provided: 1) an electrical fuse; 2) field effect transistors controlled by a microprocessor in response to one or more sensed characteristics; and 3) a voltage clamp protection circuit. In alternative embodiments, additional or fewer protection circuit mechanisms may be provided.

One embodiment of a secondary circuit is illustrated in the functional block diagram of FIG. 2 and the schematic diagram of FIG. 3. The secondary circuit includes a secondary coil 42, an electrical fuse 40, a voltage clamp protection circuit 44, a power supply rectifier diode 50, load rectifier diodes 52, a power supply 56, a temperature sensor 60, an input voltage sensor 62, a coil frequency sensor 84, a load voltage sensor 64, a gate voltage boost 68, a FET control 70, a load 82, load disconnect FETs 72, a current sensor 74 and a microprocessor 80. Additional or fewer components may be included in alternative embodiments. For example, alternative embodiments may include communication circuitry for communicating with an inductive primary or other remote devices.

The secondary coil 42 illustrated in FIGS. 2 and 3 is in a center tap configuration. Center tap configuration refers to where a connection made to a point along a winding of an inductor. In the current embodiment, the center tap is tied to ground. Alternative embodiments may not use the center tap configuration.

Electrical fuse 40 protects the circuit from large surges. In some embodiments, the electrical fuse may provide increased protection against overcurrent conditions. However, in some circumstances there may be an overvoltage condition but insufficient current to blow the electrical fuse 40. In those circumstances, the voltage clamp protection circuit 44 may provide increased circuit protection.

The voltage clamp protection circuit 44 of FIGS. 2 and 3 is described above in connection with the voltage clamp protection circuit 38 of FIG. 1. Perhaps as best seen in FIG. 3, in a center tap configuration the voltage clamp protection circuit may include multiple thermal cutoffs 102, 104 and voltage clamps 106, 108. The four devices may be thermally connected as one protection device. The particular characteristics of the voltage clamp protection circuit 44 may vary from application to application. In one embodiment, the voltage clamps 106, 108 are bidirectional TVS diodes with approximately half the rated clamping voltage of a similarly configured non center tapped design with one voltage clamp.

In an alternative embodiment, the voltage clamp protection circuit 44 may include a resistive heating option. In this embodiment, a resistor is thermally coupled to the thermal cutoff in addition to the voltage clamp. If the microprocessor detects a problem, the resistor may be connected to the coil so that the resistor heats up and trips the thermal cut off.

The rectifier diode 50 rectifies the power from the secondary coil 42 for the power supply 56 and input voltage sensor 62. The load rectifier diodes 52 rectify the power for the gate voltage boost 68, the load 82 and the load voltage sensor 64. Off the shelf diodes or specifically designed diodes may be implemented.

The power supply 56 of the embodiments illustrated in FIGS. 2 and 3 is a power supply capable of accepting a relatively large voltage and producing an appropriate power source to power the microprocessor 80 and temperature sensor 60. Alternative embodiments need not include such a power supply. Essentially any power supply that is capable of providing a stable power source for the microprocessor may be implemented.

The temperature sensor 60, input voltage sensor 62, coil frequency sensor 84, current sensor 74 and load voltage sensor 64 all sense characteristics about the secondary circuit and provide measurements to the microprocessor. The present invention is suitable for use with essentially any implementation of these sensors. Accordingly, these sensors will not be described in detail.

A temperature sensor 60 provides a temperature reading that may be used for a remote device function, a protection circuit function or both. As long as power supply 56 is operational and providing sufficient power to the temperature sensor 60 and the microprocessor 80, the temperature sensor may be used as a condition for disconnecting the load 82. In one embodiment, a simple threshold temperature is set in the microprocessor 80 and if the sensed temperature exceeds the threshold then a control signal is sent to disconnect the load 82. In other embodiments, a different scheme may be implemented to decide on what condition to disconnect the load 82. For example, a series of above-threshold temperature readings may trigger the load to disconnect.

Input voltage sensor 62 provides a voltage reading that, in the current embodiment, is primarily used for protecting the circuit. If an overvoltage condition is detected, the microprocessor 80 may send a signal to disconnect the load 82. In the current embodiment, this protects the load from an overvoltage condition, but does not do anything to protect the rest of the secondary circuit from the overvoltage condition. An overvoltage condition for the load may or may not be considered an overvoltage condition for the rest of the circuit. The voltage clamp protection circuit 44 discussed earlier is better suited to handle an overvoltage condition that effects the secondary circuit in general.

The coil frequency sensor 84 provides a frequency reading that may have many different applications, including, for example battery charging algorithms and protection related applications. As with the voltage sensor 62, any fault conditions determined from the coil frequency sensor 84 of the current embodiment trigger a load disconnect, and do not necessarily protect the other circuitry in the secondary circuit.

The current sensor 74 provides current readings to the microprocessor 80. In the current embodiment, these readings are useful for both protection functions and charging functions, among other things. As with the other sensors, exceeding a threshold can trigger a control signal to disconnect the load. Because the current sensor 74 is in series with the load 82, its placement before, as shown in the FIG. 4 embodiment, or after, as shown in the FIGS. 2 and 3 embodiment, the load is irrelevant.

The load voltage sensor 64 of the current embodiment provides information to the microprocessor 80 for use in battery charging algorithms.

The gate voltage boost circuit 68 ensures there is sufficient power for the FET control circuit 70. In embodiments with power supplies that can accept higher voltages, this circuitry ensures the FETs remain operational. In alternative embodiments with other power supplies, the gate voltage boost circuit 68 and the FET control circuit 70 may be unnecessary and may be deleted. For example, in the embodiment illustrated in FIG. 4 the microprocessor 80 connects directly with load disconnect FETs 72 and this circuitry is deleted.

Figure 4:
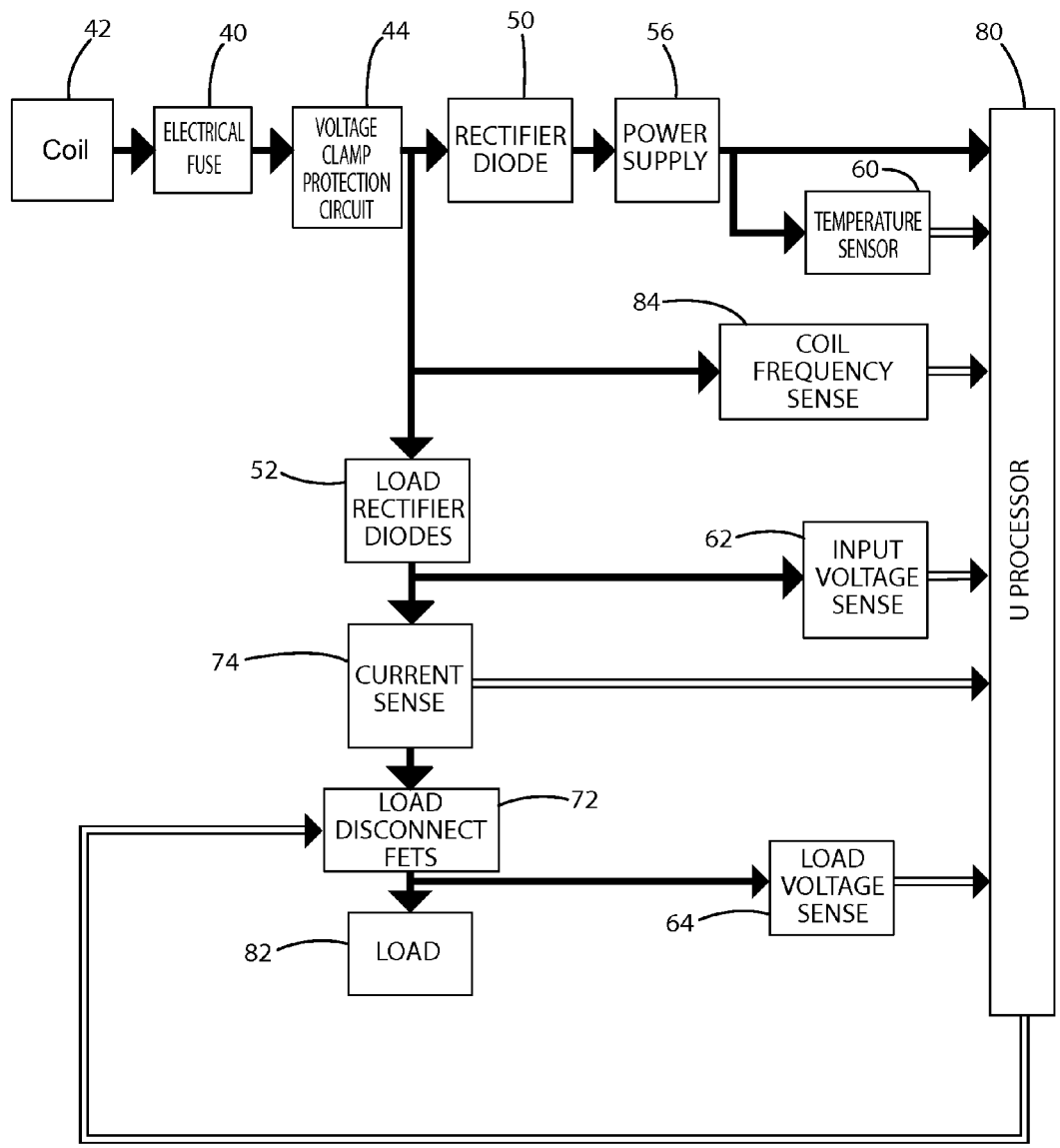
FIG. 4 is a functional block diagram of another embodiment of a secondary circuit including a voltage clamp protection circuit.

The load disconnect FETs 72 of the embodiments illustrated in FIGS. 2-4 allow the microprocessor to disconnect the load upon detection of a fault condition. As discussed above, fault conditions may include, but are not limited to, voltage fault conditions, current fault conditions, temperature fault conditions, or frequency fault conditions. The load disconnect FETs 72 serve to protect the load, but do not satisfy all of the protection needs of the circuit.

In operation, the electrical fuse 40 provides relatively quick protection for the entire circuit from large transients. The load disconnect FETs 72 in combination with the various sensors and microprocessor 80 provide various protection for the load 82. And, finally the voltage clamp protection circuit 44 provides overvoltage protection for the entire circuit, even where there is not enough current to blow the electrical fuse 40. Such overvoltage conditions have been relatively uncommon, but may increase significantly as inductively coupled systems increase in popularity.

The above description is that of the current embodiments of the invention. Various alterations and changes can be made without departing from the spirit and broader aspects of the invention. Any reference to elements in the singular, for example, using the articles "a," "an," "the" or "said," is not to be construed as limiting the element to the singular.

The invention claimed is:

1. An inductively powered secondary circuit having protection circuitry comprising:
a secondary coil for wirelessly receiving inductive power from an inductive power supply, wherein the inductively powered secondary circuit receives power wirelessly and is physically separable from the inductive power supply;
a secondary load in communication with said secondary coil;
a thermal cutoff electrically connected between said secondary coil and said secondary load, wherein in response to being heated to a threshold temperature, said thermal cutoff creates an open circuit in said protection circuit;
a voltage clamp electrically and thermally coupled to said thermal cutoff and electrically connected between said secondary coil and said secondary load, wherein said voltage clamp is adapted to clamp an input voltage to a desired level in response to an overvoltage condition and dissipate energy to said thermal cutoff in the form of heat; and
an electrical fuse electrically connected between said secondary coil and said thermal cutoff, wherein said electrical fuse disconnects said thermal cutoff, said voltage clamp, and said secondary load from said secondary coil in response to a large transient, and wherein said thermal cutoff is capable of creating an open circuit when there is insufficient power to activate said electrical fuse.

2. The protection circuit of claim 1 wherein, in response to said overvoltage condition persisting, said voltage clamp dissipates a sufficient amount of heat to reach said threshold temperature.

3. The protection circuit of claim 1 wherein, in response to said overvoltage condition persisting, said voltage clamp dissipates a sufficient amount of heat to reach said threshold temperature before said voltage clamp malfunction.

4. The protection circuit of claim 1 wherein said thermal cutoff is capable of creating an open circuit when there is insufficient power to activate an electrical fuse.

5. The protection circuit of claim 1 wherein said thermal cutoff and said voltage clamp are operational without input from a microcontroller.

6. The protection circuit of claim 1 wherein said thermal cutoff and said voltage clamp are operational without a power source.

7. The protection circuit of claim 1 wherein said at least two diodes are zener diodes, wherein at least one of said at least two diodes is electrically connected to oppose at least one other of said at least two diodes.

8. The protection circuit of claim 1 further comprising thermal adhesive, wherein said thermal adhesive assists in the transfer of heat from said voltage clamp to said thermal cutoff.

9. An inductively powered secondary circuit for receiving power from a primary circuit, said secondary circuit comprising:
a secondary coil for wirelessly receiving inductive power at an input voltage, wherein there is no physical connection between said secondary circuit and said primary circuit, wherein said inductively powered secondary circuit receives power wirelessly from the primary circuit and is physically separable from said primary circuit;
a secondary load in electrical communication with said secondary coil; and
a protection circuit electrically connected between said secondary coil and said secondary load, said protection circuit including:
a thermal cutoff, wherein in response to being heated to a threshold temperature, said thermal cutoff electrically disconnects said secondary load from said secondary coil;
a voltage clamp electrically and thermally coupled to said thermal cutoff, wherein said voltage clamp is adapted to clamp said input voltage to a desired level in response to an overvoltage condition and dissipate energy to said thermal cutoff in the form of heat; and
an electrical fuse electrically connected between said secondary coil and said protection circuit, wherein said electrical fuse disconnects said protection circuit and said secondary load from said secondary coil in response to a large transient, and wherein said protection circuit is capable of creating an open circuit when there is insufficient power to activate said electrical fuse.

10. The inductively powered secondary circuit of claim 9 wherein, in response to said overvoltage condition persisting, said voltage clamp dissipates a sufficient amount of heat to reach said threshold temperature.

11. The inductively powered secondary circuit of claim 9 wherein, in response to said overvoltage condition persisting, said voltage clamp dissipates a sufficient amount of heat to reach said threshold temperature before said voltage clamp malfunctions.

12. The inductively powered secondary circuit of claim 9 wherein said thermal cutoff is capable of disconnecting said secondary load from said secondary coil when there is insufficient power to activate an electrical fuse.

13. The inductively powered secondary circuit of claim 9 wherein said thermal cutoff and said voltage clamp are operational without input from a microcontroller.

14. The inductively powered secondary circuit of claim 9 wherein said thermal cutoff and said voltage clamp are operational without a power source.

15. The inductively powered secondary circuit of claim 9 wherein said voltage clamp is a transient voltage suppressor, said transient voltage suppressor being a bidirectional transient voltage suppressor including at least two diodes in electrical communication, said at least two diodes are zener diodes, wherein at least one of said at least two diodes is electrically connected to oppose at least one other of said at least two diodes.

16. The inductively powered secondary circuit of claim 9 further comprising thermal adhesive, wherein said thermal adhesive assists in the transfer of heat from said voltage clamp to said thermal cutoff.

17. An inductively powered secondary circuit comprising:
a secondary coil for wirelessly receiving inductive power from an inductive power supply, wherein said inductively powered secondary circuit receives power wirelessly from the inductive power supply and is physically separable from the inductive power supply; and
a secondary load in electrical communication with said secondary coil;
a microprocessor controlled field effect transistor connected between said secondary coil and said secondary load, wherein said field effect transistor disconnects said secondary load from said secondary coil in response to detection of a fault condition; and
a voltage clamp protection circuit including:
a thermal cutoff, wherein in response to being heated to a threshold temperature, said thermal cutoff electrically disconnects said secondary load from said secondary coil; and
a voltage clamp electrically and thermally coupled to said thermal cutoff, wherein said voltage clamp is adapted to clamp said input voltage to a desired level in response to an overvoltage condition and dissipate energy to said thermal cutoff in the form of heat; and
an electrical fuse electrically connected between said secondary coil and said voltage clamp protection circuit, wherein said electrical fuse disconnects said voltage clamp protection circuit, said microprocessor controlled field effect transistor, and said secondary load from said secondary coil in response to a large transient, and wherein said voltage clamp protection circuit is capable of creating an open circuit when there is insufficient power to activate said electrical fuse.

18. The inductively powered secondary circuit of claim 17 wherein, in response to said overvoltage consistent persisting, said voltage clamp dissipates a sufficient amount of heat to reach said threshold temperature.

19. The inductively powered secondary circuit of claim 17 wherein, in response to said overvoltage condition persisting, said voltage clamp dissipates a sufficient amount of heat to reach said threshold temperature before said voltage clamp malfunctions.

20. The inductively powered secondary circuit of claim 17 wherein said thermal cutoff is capable of disconnecting said secondary load from said secondary coil when there is insufficient power to activate an electrical fuse.

21. The inductively powered secondary circuit of claim 17 wherein said thermal cutoff and said voltage clamp are operational without input from a microcontroller.

22. The inductively powered secondary circuit of claim 17 wherein said thermal cutoff and said voltage clamp are operational without a power source.

23. The inductively powered secondary circuit of claim 17 wherein said voltage clamp is a transient voltage suppressor, said transient voltage suppressor being a bidirectional transient voltage suppressor including at least two diodes in electrical communication, said at least two diodes are zener diodes, wherein at least one of said at least two diodes is electrically connected to oppose at least one other of said at least two diodes.

24. The inductively powered secondary circuit of claim 17 further comprising thermal adhesive, wherein said thermal adhesive assists in the transfer of heat from said voltage clamp to said thermal cutoff.

25. The inductively powered secondary circuit of claim 17 including an electrical fuse electrically connected between said secondary coil and said secondary load, wherein said electrical fuse disconnects said secondary load from said secondary coil in response to a large transient.

* * * * *